(12) United States Patent
Peltzer

(10) Patent No.: US 6,224,778 B1
(45) Date of Patent: May 1, 2001

(54) METHOD FOR MANUFACTURING A SYSTEM FOR MIXING FLUIDS

(76) Inventor: Charles T. Peltzer, 3950 Miraloma, Anaheim, CA (US) 92806

( * ) Notice: Subject to any disclaimer, the term of this patent is extended or adjusted under 35 U.S.C. 154(b) by 0 days.

(21) Appl. No.: 09/428,238

(22) Filed: Oct. 26, 1999

Related U.S. Application Data

(63) Continuation-in-part of application No. 09/040,971, filed on Mar. 18, 1998, now Pat. No. 5,993,671.

(51) Int. Cl.⁷ ................................................. B01D 17/12
(52) U.S. Cl. ...................... 210/739; 210/96.1; 210/101; 137/3; 137/88; 366/152.1; 366/160.1
(58) Field of Search .................. 210/88, 96.1, 101, 210/103, 134, 136, 137, 143, 739, 742, 743, 746, 806; 137/3, 4, 88, 93; 366/132, 134, 151.1, 152.1, 152.3, 136, 137, 152.4, 160.1; 364/528, 528.01, 528.08

(56) References Cited

U.S. PATENT DOCUMENTS

| | | | |
|---|---|---|---|
| 3,946,113 | * 3/1976 | Seiberling | 426/231 |
| 4,075,355 | * 2/1978 | Pato | 426/231 |
| 5,407,267 | * 4/1995 | Davis et al. | 366/160.1 |
| 5,522,660 | * 6/1996 | O'Dougherty et al. | 366/136 |
| 5,641,410 | * 6/1997 | Peltzer | 210/739 |
| 5,823,219 | * 10/1998 | Purvis et al. | 137/5 |
| 5,866,804 | * 2/1999 | O'Keeffe | 426/231 |
| 5,993,671 | * 11/1999 | Peltzer | 210/739 |
| 5,997,750 | * 12/1999 | Rozelle et al. | 210/806 |
| 6,077,444 | * 6/2000 | Peltzer | 210/743 |

* cited by examiner

Primary Examiner—Joseph W. Drodge
(74) Attorney, Agent, or Firm—Walter A. Hackler

(57) ABSTRACT

A method of manufacturing a system for mixing fluids for providing a flow of a fluid product having a certain pre-established quality or characteristic, from a flow of a first fluid component and a flow of a second fluid component, wherein the fluid components do not meet the pre-established quality standards of the fluid product. The system includes a mixing reservoir; first and second fluid conduits connected to the mixing reservoir for flowing the first fluid component and the second fluid component, respectively, into the reservoir; and a third fluid conduit connected to the mixing reservoir for discharging a flow of fluid product from the mixing reservoir, and sensors connected for sensing the flow rates and qualities of the first and second fluid components, flowing into the mixing reservoir and of the fluid product discharged from the mixing reservoir. Signals, associated with the sensors indicate the sensed flow rates and qualities, and controls responsive to the signals regulate the flows of fluid components into the mixing reservoir through controlled flow valves in the first and second conduits so as to cause the quality of the fluid product discharged from the mixing reservoir to at least meet the pre-established quality standards.

10 Claims, 2 Drawing Sheets

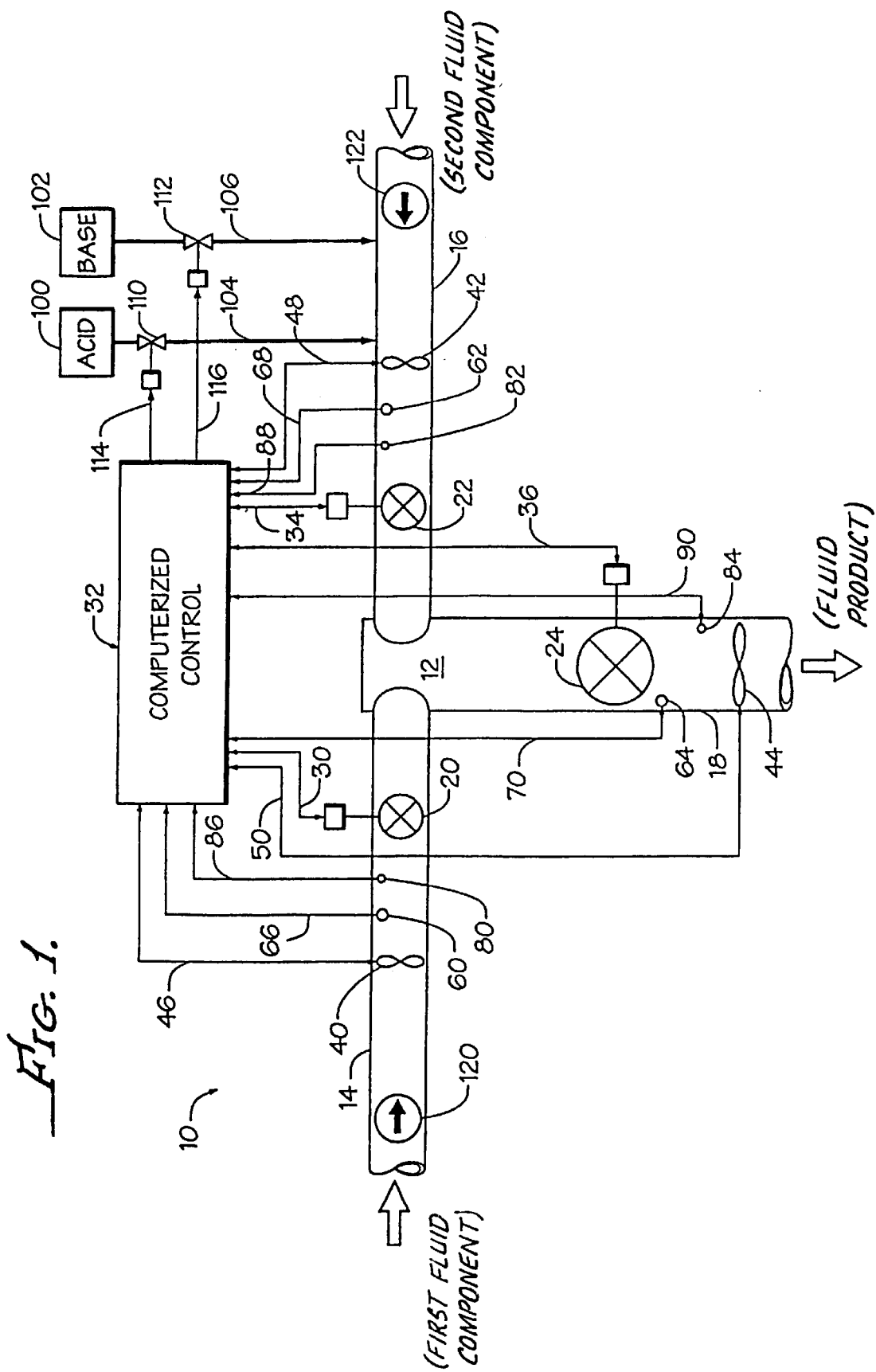

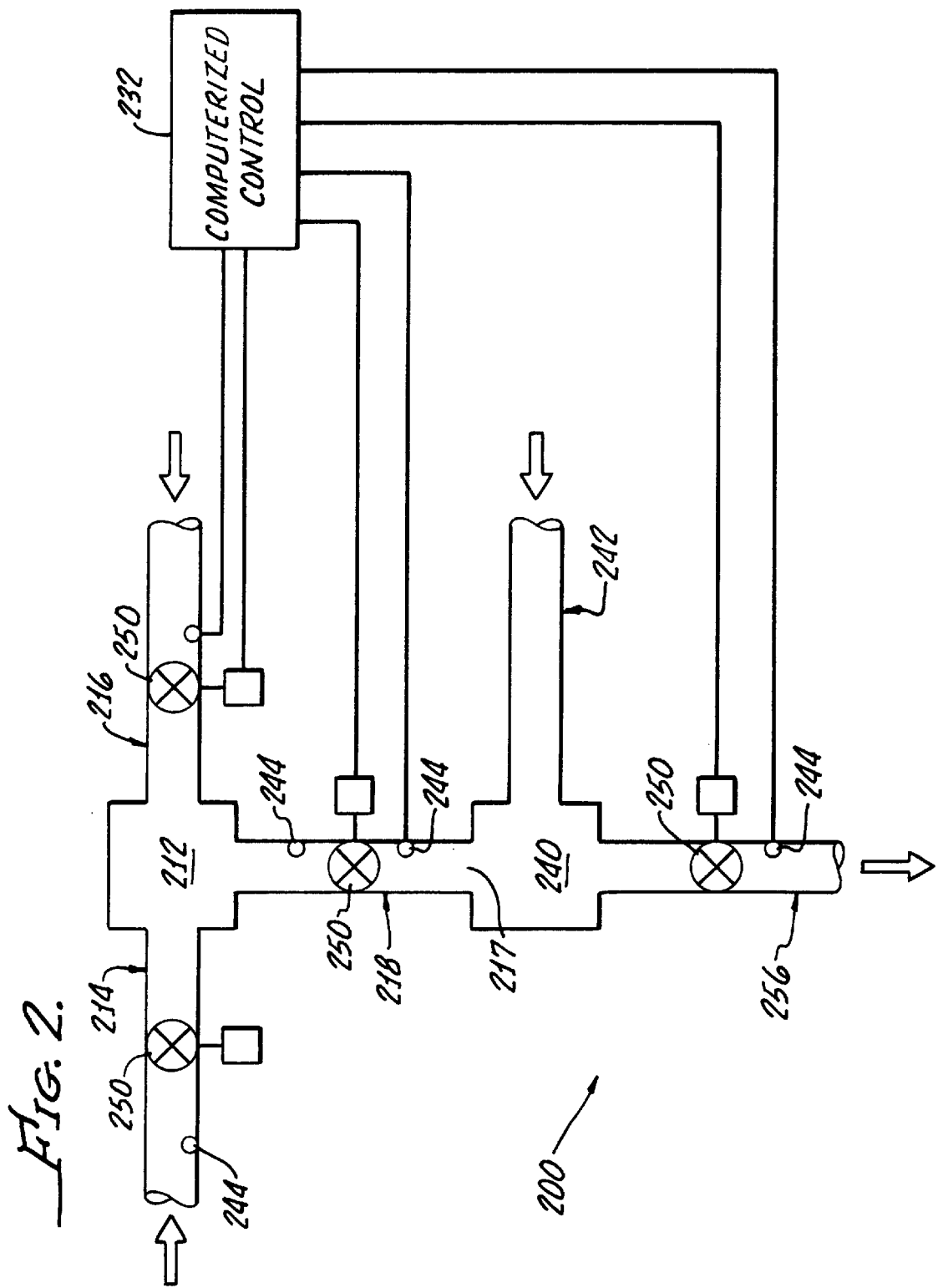

METHOD FOR MANUFACTURING A SYSTEM FOR MIXING FLUIDS

CROSS REFERENCE TO RELATED APPLICATIONS

This application is a continuation-in-part of U.S. patent application Ser. No. 09/040,971, filed on Mar. 18, 1998 in the name of Peltzer, now U.S. Pat. No. 5,993,671.

BACKGROUND OF THE INVENTION

1. Field of the Invention

The present invention relates generally to the field of water-treatment systems, and more particularly to systems for converting reclaimed water into treated water useful for watering parkways, highway borders, crop irrigation, and other uses.

In a different aspect of the invention, the present invention relates to the field of fluid mixing systems, and more particularly systems for converting water-based fluid components into fluid products, such as paints, fluid varnishes and other coatings, medicaments, beverages etc., wherein said water based fluid products have certain pre-established qualities, such as color, viscosity, water content, flavor, salinity etc.

2. Description of Related Art

Water conservation, as well as anti-pollution laws and regulations are in effect in many parts of the United States and in many countries outside the United States. Often these requirements are addressed together with the use of treated, but non-potable, reclaimed, typically referred to as "treated water". Typical of such uses are the watering of golf courses, parks and highway borders and median strips, and the irrigation of some types of crops.

As above mentioned, the reclaimed water, which may comprise sanitized water from sewage plants and industrial processes, or certain types of run-offs, requires a certain amount of treatment or additional treatment in order to bring the reclaimed water up to acceptable treated water standards. This requirement typically involves two problems: the pre-treated effluent may vary from time-to-time, and/or in location-to-location, in such parameters as pH, the amount of total dissolved solids (TDS), and the flow rate, and the treated water requirements as to the foregoing may be different in different locations and may even vary in a given locality according to the intended use.

Because of the variables involved with both the innate quality of the reclaimed water and the requirements for the treated water, the treatment of a flow of reclaimed water with just the minimal amount of clean treatment water to provide a treated water meeting the pre-established quality levels has been difficult if not impossible to provide in an economical manner.

The present inventor has described a system for treating reclaimed water to provide treated water and a method of using said system to provide treated water from reclaimed water. (See U.S. Pat. No. 5,641,410 to Peltzer which is hereby incorporated by reference in its entirety.) It has been found to be possible to convert many existing waste water treating systems into systems which can be utilized to practice the method of U.S. Pat. No. 5,641,410 and other similar methods of converting reclaimed water into potable water.

It is also desirable to construct new waste water treating systems to practice the method of U.S. Pat. No. 5,641,410 and other similar methods of converting reclaimed water into potable water.

In addition, the present inventor has discovered new and useful ways of converting water-based fluid components of a fluid product into a fluid product exhibiting certain desired pre-established qualities or characteristics.

It is therefore, a principal objective of the present invention to provide a method of constructing an effective and efficient system for converting fluid components into a final fluid product having a pre-defined or pre-established quality or characteristic by mixing an amount of a first fluid component with a second fluid component.

It is yet another object of the invention to provide a method of mixing fluid components to obtain a water-based fluid product, wherein at least one of said fluid components is a water-based fluid component and wherein the fluid product exhibits particular, desirable, pre-established characteristics or qualities.

It is yet another object of the invention to provide a fluid mixing system having multiple mixing stages wherein the qualities of the combined waters or other fluids may be monitored along intermediate mixing stages.

Other objects and advantages of the instant invention will be apparent from a careful reading of the specification below.

BRIEF SUMMARY OF THE INVENTION

The present invention provides a method of manufacturing a water treatment system for providing a flow of treated water having a pre-established quality from a flow of reclaimed water having a quality poorer than said pre-established quality of said treated water and a flow of treatment water having a quality better than said pre-established quality of said treated water said water qualities based on parameters including relative conductivity or TDS values, said method comprising:

a. providing a mixing reservoir;

b. connecting first and second fluid conduits to said mixing reservoir for respectively flowing said reclaimed water and said treatment water into said mixing reservoir;

c. connecting a third fluid conduit to said mixing reservoir for discharging a flow of treated water from said mixing reservoir;

d. providing sensing means for sensing parameters including (1) the flow rate and quality of the reclaimed water entering the mixing reservoir through said first fluid conduit, (2) the flow rate and quality of the treatment water entering the mixing reservoir through said second fluid conduit, and (3) the quality of the treated water being discharged from said mixing reservoir through said third fluid conduit, said sensing means including separate water conductivity measuring means installed in said first and second fluid conduits upstream of said mixing reservoir and in said third fluid conduit downstream of said mixing reservoir;

e. providing signal generating means responsive to said separate conductivity measuring means for providing signals indicative of the TDS levels in said reclaimed water, in said treatment water and in said treated water and indicative of said sensed water flow rates; and f. providing control means responsive to said provided signals for regulating the flows of reclaimed water and treatment water into said mixing reservoir through said first and second fluid conduits so as to cause the quality of the treated water discharged from said mixing reservoir through said third fluid conduit to be at least about as good as said pre-established treated water quality, said pre-established treated water quality including a pre-established maximum TDS level.

The present invention also provides a method for converting an existing water treatment system to provide a flow of treated water having a pre-established quality from a flow of reclaimed water having a quality poorer than said pre-established quality of said treated water and a flow of treatment water having a quality better than said pre-established quality of said treated water said water qualities based on parameters including relative conductivity or TDS values wherein said existing water treatment system comprises:

g. a mixing reservoir;

h. first and second fluid conduits connected to said mixing reservoir for respectively flowing said reclaimed water and said treatment water into said mixing reservoir; and i. a third fluid conduit connected to said mixing reservoir for discharging a flow of treated water from said mixing reservoir; which method comprises d. providing sensing means for sensing parameters including (1) the flow rate and quality of the reclaimed water entering the mixing reservoir through said first fluid conduit, (2) the flow rate and quality of the treatment water entering the mixing reservoir through said second fluid conduit, and (3) the quality of the treated water being discharged from said mixing reservoir through said third fluid conduit, said sensing means including separate water conductivity measuring means installed in said first and second fluid conduits upstream of said mixing reservoir and in said third fluid conduit downstream of said mixing reservoir;

e. providing signal generating means responsive to said separate conductivity measuring means for providing signals indicative of the TDS levels in said reclaimed water, in said treatment water and in said treated water and indicative of said sensed water flow rates; and j. providing control means responsive to said provided signals for regulating the flows of reclaimed water and treatment water into said mixing reservoir through said first and second fluid conduits so as to cause the quality of the treated water discharged from said mixing reservoir through said third fluid conduit to be at least about as good as said pre-established treated water quality, said pre-established treated water quality including a pre-stablished maximum TDS level.

Said signal generating means may include electrical signal generating means.

The control means may include first and second electrically-controlled flow valves installed respectively in respective ones of said first and second fluid conduits upstream of said mixing reservoir, said control means automatically controlling the opening and closing of said first and second valves to thereby regulate the flows of reclaimed water and treatment water into the mixing reservoir through said first and second fluid conduits so as to cause the treated water being discharged from the mixing reservoir through the third fluid conduit to be at least about as good as the pre-established quality of the treated water.

Said control means may include means responsive to electrical signals from said electrical signal generating means for controlling operation of said valves so as to regulate the flows of reclaimed water and treatment water into the mixing reservoir in a manner causing the TDS level of the treated water discharged from the mixing reservoir through the third fluid conduit to be no greater than said pre-established TDS level.

The method of the present invention, as it relates to a method of manufacturing a water treatment system, may also comprise providing first, second and third pH measuring means installed respectively in said first and second fluid conduits upstream of said mixing reservoir and in said third fluid conduit downstream of said mixing reservoir, said signal generating means, e.g. electrical signal generating means, also being responsive to said pH measuring means for providing signals to said control means indicative of the pH levels of the reclaimed water, of the treatment water and of the treated water to thereby enable the operator to provide potable water having a pre-established pH range.

Furthermore, the method of the present invention as it relates to a method of manufacturing a water treatment system may, include providing a source of acid and a source of base and including acid and base conduits connected for flowing acid from said acid source and base from said base source into said flow of treatment water, and wherein said control means include electrically controlled acid and base valves installed respectively in said acid conduit and said base conduit for controlling the flow of acid and base into said flow treatment water and thereby controlling the pH of said treatment water.

In existing waste water treatment systems, a source of acid and a source of base and conduits and valves, therefore, as well as pH measuring means, may be included in the existing systems. In such existing systems the method of converting the existing system into a waste water system to provide potable water having a pre-established pH range will comprise operably connecting said first and second sensing means with said acid and base valves for controlling the flow of acid and base into said flow treatment water to thereby control the pH of said treatment water.

The method of the present invention may also comprise including sensing means that includes first and second fluid flow meters installed respectively in said first and second fluid conduits upstream of said mixing reservoir for measuring the flow rates of the reclaimed and treatment water entering the mixing reservoir, and wherein said signal generating means provides electrical signals to said control means indicative of said flow rates of said reclaimed water and treatment water.

The method of the present invention may also comprise including one-way flow valves installed in the first and second fluid conduits so that the reclaimed water is prevented from flowing into the treatment water second conduit and so that the treatment water is prevented from flowing into the reclaimed water first conduit.

The method of the present invention may also comprise including means installed in said third conduit for enhancing mixing of the reclaimed and treatment waters in the mixing reservoir.

In one particularly advantageous embodiment of the present invention, a method of manufacturing a system for mixing fluid components to obtain a fluid product aving qualities that meet selected pre-established standards, is provided. The method generally comprises the steps of:

(a) providing a mixing reservoir;

(b) connecting first and second fluid conduits to the mixing reservoir for respectively flowing a first fluid component and a second fluid component into said mixing reservoir;

(c) allowing the first fluid component and the second fluid component to mix within the mixing reservoir;

(d) providing sensing means for sensing qualities including: (1) a flow rate and quality of the first fluid component in the first fluid conduit upstream of the mixing reservoir, (2) a flow rate and quality of the second fluid component in the second fluid conduit upstream of the mixing reservoir, and (3) quality of the mixed fluid within in the mixing reservoir;

(e) providing signal generating means responsive to said sensing means for providing signals indicative of the quality of the first fluid product and indicative of the sensed fluid flow rates; and (f) providing control means responsive to said provided signals for regulating the flows of the first fluid component and of the second fluid component into said mixing reservoir through said first and said second fluid conduits so as to cause the quality of the fluid product within the mixing reservoir meet a selected pre-established standard.

It should be appreciated that multiple mixing stages may also be provided in accordance with the single stage embodiments shown and hereinabove described. For example, the third fluid conduit and an additional fourth fluid conduit may be connected to a second mixing reservoir to provide the addition of another, third fluid component into the final fluid product.

BRIEF DESCRIPTION OF THE DRAWINGS

The present invention can be more readily understood by a consideration of the following detailed description when taken in conjunction with the accompanying drawings of which:

FIG. 1 shows an automated system, suitable for performing a method of the invention, for treating reclaimed water and converting it into treated water, or an automated system for obtaining a flow of a water-based fluid product having desired pre-established qualities, by mixing automatically measured amounts of a first fluid component with a second fluid component; and FIG. 2 shows a multiple stage system of the single stage system shown in FIG. 1, for mixing waters or other fluid products.

DETAILED DESCRIPTION OF A PREFERRED EMBODIMENT OF THE INVENTION

There is shown in FIG. 1, an automated reclaimed water treatment system 10 that may be manufactured by the method of the present invention or, as discussed above, an existing water treating system may be converted into said reclaimed water treatment system 10, or, in another aspect of the invention, the Figure shows a fluid mixing system 10 for converting a first fluid component and a second fluid component into a fluid product having certain pre-defined, pre-established qualities or characteristics.

In any event, the system 10 is useful for providing a flow of treated water, or a water-based fluid product having a pre-established quality requirement from fluid components not meeting the pre-established quality requirements.

For example, in one embodiment, described in detail the quality requirements for a fluid product comprising treated potable or non-potable water may include a maximum allowable amount of TDS, salinity, microbiological content, and a particular, acceptable pH range. By way of example, with no limitations thereby implied or intended, the treated water may have a TDS requirement of about 750±50 parts per million (PPM) and a required pH range between 7 and 7.5. In contrast, the reclaimed water may have a TDS level anywhere between about 300 and 5000 PPM and a pH between about 6 and about 9.

The treatment water, which as explained below is combined with the reclaimed water as required to provide the treated water, may be potable-quality city water or water from a well or other clean water source. Typically, the treatment water will have no more than about 20 TDS and will typically have a pH of about 7.

Shown in the drawing comprising system 10 are a water mixing reservoir or mixing region 12 and respective first, second and third fluid conduits 14, 16 and 18 which are connected in fluid flow relationship to the mixing reservoir. First conduit 14 is connected for delivering a flow of the reclaimed water to mixing reservoir 12, second conduit 16 is connected for delivering a flow of the treatment water to the mixing reservoir, and third conduit 18 is connected for discharging a flow of the treated water from the mixing reservoir.

First inlet conduit 14 has a cross sectional area equal to $A_1$ and second inlet conduit 16 has a cross section area equal to $A_2$, and third outlet conduit 18 has a cross sectional area equal to $A_3$ which is preferably equal to the combined cross section areas $A_1$ and $A_2$.

Respective first and second control valves 20 and 22 are installed in respective fluid conduits 14 and 16 upstream of mixing reservoir 12 to control the flow of reclaimed water and the flow of treatment water into the mixing reservoir. As shown in the drawing, valves 20 and 22 are installed in conduits 14 and 16 relatively adjacent to mixing reservoir 12.

A third flow control valve 24 is installed in treated water conduit 18 just downstream of mixing reservoir 12. Third valve 24 serves to enhance the mixing of the flows of reclaimed water and treatment water in making reservoir 12.

Preferably, all of first, second and third valves 20, 22 and 24 are of the electronically-controlled type, as is well known in the fluid flow control art. That is, each of such valves 20, 22 and 24 are electrically operated for any desired amount of opening and closing.

First valve 20 is shown operatively connected, by an electrical conduit 30, to a computerized control 32. Similarly, second and third valves 22 and 24 are operatively connected to control 32 by respective electrical conduits 34 and 36.

First and second fluid flowmeters 40 and 42 are installed in respective first and second fluid conduits 14 and 16, preferably upstream of respective first and second valves 20 and 22, for respectively measuring the flow rates of the reclaimed water and the treatment water entering mixing reservoir 12. A third fluid flowmeter 44 is installed in third fluid conduit downstream of third valve 24 for measuring the flow rate of the treated water discharged from mixing reservoir 12. First, second and third flowmeters 40, 42 and 44 are operatively connected to control 32 by respective electrical conduits 46, 48, and 50.

A fluid conductivity sensor 60 is installed in first conduit 14 intermediate first flowmeter 40 and first valve 20 for measuring the TDS in the reclaimed water. A second fluid conductivity sensor 62 is installed in second conduit 16 intermediate second flowmeter 42 and second valve 22 for measuring TDS in the treatment water flowing into mixing reservoir 12. A third fluid conductivity sensor 64 is installed in third conduit 18 intermediate third flowmeter 44 and third valve 24 to measure the TDS in the treated water discharged from mixing reservoir 12. First, second and third fluid conductivity sensors 60, 62 and 64 are operatively connected to control 32 by respective electrical conduits 66, 68 and 70.

A first pH meter or sensor 80 is installed in first conduit 14 intermediate first flowmeter 40 and first valve 20 for measuring the pH of the reclaimed water. A second pH meter or sensor 82 is installed in second conduit 16 intermediate second flowmeter 42 and second valve 22 for measuring the pH of the treatment water flowing into mixing reservoir 12. A third pH meter or sensor 84 is installed in third conduit 18 intermediate third flowmeter 44 and third valve 24 to measure the pH of the treated water discharged from mixing reservoir 12.

First, second and third pH meters or sensors 80, 82, and 84 are operatively connected to control 32 by respective electrical conduits 86, 88 and 90.

Preferably, system 10 includes a fluid source 100 of acid and a fluid source 102 of base. As shown in the drawing, acid source 100 is connected to second conduit 16 upstream of second flowmeter 42 by a fluid conduit 104 and base source 102 is connected to second conduit 16 upstream of second flowmeter 42 by a fluid conduit 106.

Fourth and fifth, electrically actuated flow control valves 110 and 112 are installed in respective fluid conduits 14 and 16 upstream of respective flowmeters 40 and 42. In particular, second check valve 122 is needed to prevent the contamination of the clean water by reclaimed water. First check valve 120 is useful to prevent the loss of treatment water into the source of reclaimed water.

The above described water treatment system operates as follows: Control 32 receives electrical inputs from first, second and third flowmeters 40, 42 and 44 (over respective electrical conduits 46, 48 and 50) indicative of the respective flow rates of the reclaimed water, the treatment water and the treated water. Control 32 also receives electrical inputs from first, second and third conductivity sensors 60, 62 and 64 (over respective electrical conduits 66, 68 and 70) indicative of the respective levels of TDS in the reclaimed water, the treatment water and the treated water. Further, control 32 receives electrical inputs from first, second and third pH meters or sensors 80, 82 and 84 (over respective electrical conduits 86, 88 and 90) indicative of the respective pH levels in the reclaimed water, the treatment water and the treated water.

Based on such flow rate, TDS and pH level inputs, control 32 controls first and second flow control valves 20 and 22 which controls the amounts of reclaimed water and treatment water flowing into mixing reservoir 12 in a manner causing the treated water discharged from the mixing reservoir to have the required quality. For example, if the reclaimed water flowing into mixing reservoir 12 has a TDS level much higher than required for the treated water discharged from the mixing reservoir, the flow of reclaimed water is throttled down by partially closing first valve 20 and the flow of treatment water from second conduit into mixing reservoir 12 is increased by opening second valve 22 until the required maximum TDS level of the treated water discharged from the mixing reservoir is achieved. If a particular flow rate of the treated water is required, first and second valves 20 and 22 are also operated to achieve that required treated water flow rate.

The required pH range of the treated water can, if needed, then be attained, without changing the settings of first and second valves 20 and 22 needed so that the treated water maximum allowable TDS is not exceeded, by the appropriate opening or closing of acid and base valves 104 and 106, provided that the addition of acid or base to the flow of treatment water through second conduit 16 is needed to enable attaining of the required treated water pH range.

Thus, by the appropriate operation of first, second, fourth and fifth valves 20, 22, 110 and 112, treated water meeting the pre-established quality can be obtained with a minimum use of the more costly treatment water, as is desirable from a cost standpoint, if not required by local water regulations. Although the operation of such valves to meet the required treated water quality can be done manually by an operator, it is within the scope of the present invention that the operation of such valves be computer controlled in response to the above-described electrical inputs into control 32 in a manner within the knowledge of one of ordinary skill in the computer art.

Although there has been described and illustrated a method for manufacturing an automated system for treating a flow of reclaimed water with clean water in amounts providing a usable treated water, and a method of converting an existing water treating system into such automated system, for the purpose of illustrating the manner in which the invention may be used to advantage, it should be understood that the invention is not limited thereto. Therefore, any and all variations and modifications that may occur to those skilled in the applicable art are to be considered as being within the scope and spirit of the claims as appended thereto.

For example, although in the above-described preferred embodiment of the water treatment system of the present invention, all of the signal generating means have been described in terms of producing electrical signals, this communication can be accomplished by optical signals through fiber optic lines.

In addition, although the above described preferred embodiment of the water treatment system of the present invention describes a method of providing a flow of treated water having a pre-established quality based on parameters including both pH and conductivity or TDS values, such water treatment system may be utilized to provide a flow of treatment water having a pre-established quality based on conductivity or TDS values, only.

Turning now to FIG. 2, a multiple stage system 200, suitable for performing a method of the invention is shown. It should be appreciated therefor that in addition to the single mixing stage embodiments described herein, a plurality of mixing stages may be provided, wherein each mixing stage is designed generally in accordance with the single stage mixing embodiments described herein, with appropriate modification thereto.

The multiple stage embodiment is especially advantageous in instances where it would be beneficial to be able to measure parameters or qualities of the treated water during intermediate stages of mixing in order to assure that the mixing is progressing as desired.

Further, it would also be advantageous in the instance where several fluid components are to be mixed, or where several reclaimed water sources are to be concurrently treated by a single water treatment facility to obtain one or more flows of treated water.

For example, as mentioned hereinabove, reclaimed water sources are not often consistent in quality or flow rate. In other words, each reclaimed water source may exhibit a different flow rate and/or a different quality which varies throughout a year or a single day. Because the present system is designed to automatically measure and automatically adjust an inflow rate of the water components into the mixing region, the multiple stage system would be beneficial even in the event that several water sources are being drawn upon. In addition, the multiple stage system would be advantageous in the instance where fluid components must be added separately and/or at different times during mixing, yet it is desirable to keep a consistent outflow of treated water.

For example, as shown, an outlet 217 of the third fluid conduit 218 may be connected to a second mixing reservoir 240. A fourth fluid conduit 242 containing a fluid to be mixed with the contents of the third conduit 218 may also be connected to the second mixing reservoir 240. Sensing means 244 may be provided at various, strategic locations to provide date input for the controller 232, which as described hereinabove, will regulate opening and closing of valves 250 in the fluid conduits 214, 216, 218, 242.

For example the fourth fluid conduit may contain for example, a second source of reclaimed water, treatment water or any other fluid that is to be added prior to discharging of a final fluid product from the second mixing reservoir 240, for example, by means of a fifth fluid conduit 256.

Another aspect of the present invention provides a method of manufacturing a system for mixing fluid components other than reclaimed water and treatment water. For example, a first fluid component and a second fluid component may be combined in accordance with the system and method hereinabove described, to obtain a fluid product having qualities that meet selected pre-established standards or qualities. The pre-established qualities may include a particular color or pigment, a specific mineral content, a preferred viscosity, specific gravity or any other quality measurable in a fluid.

Turning now again to FIG. 1, the method in accordance with this embodiment generally comprises the steps described in detail hereinabove. However, instead of the first conduit, second conduit, and third conduit containing reclaimed water, treatment water and treated water respectively, the first, second and third conduits may contain therefor first fluid component, second fluid component and a final fluid product respectively wherein the final fluid product consists of a desired combination of first and second fluid components and exhibits certain desirable characteristics or pre-established qualities. The method may therefor include the steps of establishing a desired standard for a specific selected quality of a fluid product, and the fluid components have qualities which do not meet the selected pre-established quality standards.

For example, the fluid product may be a fluid medicament which is to have a particular, pre-established level of a flavoring, selected for making the medicament desirable for oral consumption by children. The fluid components of the fluid medicament product may comprise a flow of an unflavored medicament, and a flow of a concentrated non-medicinal flavoring. By utilizing the method of the present invention, the level of flavoring in the final medicament may be adjusted automatically by means of the present invention based on an operator's input of data into the control unit. The operator inputted data may for example relate to a pre-established level of flavor based on a particular child for whom the medicament is intended. Of course, this is only one possible use for the method in accordance with the invention, and numerous other uses are also considered to be within the scope of the present invention.

In this embodiment, the sensing means may be adapted to sense (1) a quality of the first fluid component in the first fluid conduit upstream of the mixing reservoir, (2) a quality of the second fluid component in the second fluid conduit upstream of the mixing reservoir, and (3) a quality of the mixed fluid within in the mixing reservoir. Preferably, the sensing means is also adapted to sense a flow rate of at least one of either the first or second components upstream of the third fluid conduit, or if applicable, upstream of the mixing reservoir. This feature is particularly advantageous in instances wherein at least one of the fluid components being drawn into the system has a variable flow rate. The sensed fluid flow rate may therefore be utilized by the controller in order to control the valves in the respective conduit so as to regulate a flow rate of fluid component being discharged into the third fluid conduit or mixing reservoir.

As discussed in general hereinabove, the fluid product and the fluid components thereof may comprise medicaments, paints, beverages, and other fluid products. At least one of the fluid components may be a water or a water-based fluid. In addition, multiple mixing stages may be used as described hereinabove.

Although there has been hereinabove described a method of manufacturing a system for mixing fluids, in accordance with the present invention, for the purpose of illustrating the manner in which the invention may be used to advantage, it will be appreciated that the invention is not limited thereto. Accordingly, any and all modifications, variations, or equivalent arrangements which may occur to those skilled in the art should be considered to be within the scope of the invention as defined in the appended claims.

What is claimed is:

1. A method of manufacturing a system for fluid components to obtain a final fluid product having qualities that meet selected pre-established quality standards, the method comprising the steps of:

establishing a desired standard for a specific selected quality of a final fluid product;

providing a first mixing reservoir;

connecting first and second fluid conduits to the mixing reservoir for respectively flowing a first fluid component and a second fluid component into said mixing reservoir, wherein said first and said second fluid components do not meet the selected pre-established quality standards;

allowing the first fluid component and the second fluid component to mix within the mixing reservoir;

providing first sensing means for sensing fluid qualities including: (1) a quality of the first fluid component in the first fluid conduit upstream of the mixing reservoir, (2) a quality of the second fluid component in the second fluid conduit upstream of the mixing reservoir, and (3) quality of the mixed fluid within in the mixing reservoir;

providing first signal generating means responsive to said sensing means for providing signals indicative of the quality of the first fluid component;

providing first control means responsive to said provided signals for regulating a flow rate of the first fluid component and a flow rate of the second fluid component into said mixing reservoir through said first and said second fluid conduits so as to cause the quality of an interim fluid product within the mixing reservoir to meet an interim standard;

providing a second mixing reservoir;

connecting third and fourth fluid conduits to the second mixing reservoir for respectively flowing a third fluid component and the interim fluid product interim fluid product strandard fluid components which do not meet the selected pre-established quality standards;

allowing the third fluid component and the interim fluid product to mix within the second mixing reservoir;

providing second sensing means for sensing fluid qualities including: (1) a quality of the third fluid component in the third fluid conduit upstream of the mixing reservoir, (2) a quality of the interim fluid product in the fourth fluid conduit upstream of the second mixing reservoir, and (3) quality of the mixed fluid within the second mixing reservoir;

providing second signal generating means responsive to said sensing means for providing signals indicative of the quality of the third fluid component; and providing second control means responsive to said provided signals for regulating a flow rate of the third fluid component and a flow rate of the interim fluid product into said second reservoir through said third and said fourth fluid conduits so as to cause the quality of the final fluid product within the second mixing reservoir to meet the selected pre-established quality standard.

2. The method according to claim 1 wherein the step of providing first sensing means further includes sensing the flow rate of the first fluid component in the first fluid conduit upstream of the first mixing reservoir.

3. The method in accordance with claim 1 wherein the first control means includes first and second flow valves installed respectively in at respective ones of said first and second fluid conduits upstream of the mixing reservoir, the first control means automatically controlling the opening and closing of the first and second flow valves to thereby regulate the flows of first fluid component and second fluid component so as to cause the fluid product being discharged from the mixing reservoir through the third fluid conduit to meet the selected pre-established standard.

4. The method in accordance with claim 1 including one-way flow valves installed in the first and second fluid conduits so that the first fluid component is prevented from flowing into the second fluid component second conduit and so that the second fluid component is prevented from flowing into the first fluid component first conduit.

5. The method in accordance with claim 1 further comprising the step of enhancing mixing of the first fluid component and the second fluid component in the first mixing reservoir.

6. A method of manufacturing a system for mixing fluid components to obtain a final fluid product having qualities that meet selected pre-established quality standards, the method comprising the steps of:

establishing a desired standard for a specific selected quality of final fluid product;

connecting first and second fluid conduits to a third fluid conduit for respectively flowing a first fluid component and a second fluid component into said third fluid conduit, wherein said first and said second fluid components do not meet the selected pre-established quality standards;

providing first sensing means for sensing fluid qualities including: (1) a quality of the first fluid component in the first fluid conduit upstream of the third fluid conduit, (2) a quality of the second fluid component in the second fluid conduit upstream of the third fluid conduit, and (3) a quality of the mixed fluid within in the third fluid conduit;

providing first signal generating means responsive to said sensing means for providing signals indicative of the quality of the first fluid component;

providing first control means responsive to said provided signals into said third fluid conduit through said first fluid conduit so as to cause the quality of an interim fluid product within the third fluid conduit to meet an interim quality standard, connecting fourth and fifth fluid conduits to a sixth fluid conduit for respectively flowing a third fluid component and the interim fluid product into said sixth fluid conduit, wherein said third component and said interim fluid product do not meet the selected pre-established quality standards;

providing second sensing means for sensing fluid qualities including: (1) quality of the third fluid component in the fourth fluid conduit upstream of the sixth fluid conduit, (2) a quality of the interim fluid product in the fifth fluid conduit upstream of the sixth fluid conduit, and (3) a quality of the mixed fluid within in the sixth fluid conduit;

providing second signal generating means responsive to said sensing means for providing signals indicative of the quality of the third fluid component; and providing second control means responsive to said provided signals for regulating a flow rate of the third fluid component into said sixth fluid conduit through said third fluid conduit so as to cause the quality of the final fluid product within the sixth fluid conduit to meet the selected pre-established quality standard.

7. The method according to claim 6, wherein the step of providing first sensing means further includes sensing the flow rate of the first fluid component in the first fluid conduit upstream of the third fluid conduit.

8. The method in accordance with claim 7 wherein the first control means includes first and second flow valves installed respectively in at respective ones of said first and second fluid conduits upstream of the third fluid conduit, the first control means automatically controlling the opening and closing of the first and second flow valves to thereby regulate the flows of first fluid component and second fluid component so as to cause the fluid product within the third fluid conduit to meet the selected pre-established standard.

9. The method in accordance with claim 6 including one-way flow valves installed in the first and second fluid conduits so that the first fluid component is prevented from flowing into the second fluid component second conduit and so that the second fluid component is prevented from flowing into the first fluid component first conduit.

10. The method in accordance with claim 6 further comprising the step of enhancing mixing of the first fluid component and the second fluid component in the third fluid conduit.

* * * * *